United States Patent
Li et al.

(10) Patent No.: US 8,351,405 B2
(45) Date of Patent: Jan. 8, 2013

(54) METHOD AND APPARATUS FOR SIGNALING BEACONS IN A COMMUNICATION SYSTEM

(75) Inventors: Junyi Li, Bedminster, NJ (US); Vladimir Parizhisky, New York, NY (US); Alexander Leonidov, Somerset, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 738 days.

(21) Appl. No.: 11/486,653

(22) Filed: Jul. 14, 2006

(65) Prior Publication Data
US 2008/0013479 A1 Jan. 17, 2008

(51) Int. Cl.
*H04J 3/00* (2006.01)
(52) U.S. Cl. .................. 370/336; 370/328
(58) Field of Classification Search .......... 370/330, 370/311, 331, 332, 478; 455/436, 437, 403, 455/456, 434, 522, 454
See application file for complete search history.

(56) References Cited

U.S. PATENT DOCUMENTS

| | | | |
|---|---|---|---|
| 5,355,367 A | 10/1994 | Comroe et al. | |
| 5,361,258 A * | 11/1994 | Arnold et al. | 370/330 |
| 5,410,538 A | 4/1995 | Roche et al. | |
| 5,522,011 A * | 5/1996 | Epstein et al. | 704/222 |
| 5,539,728 A | 7/1996 | Gaiani et al. | |
| 5,561,842 A | 10/1996 | Ritter et al. | |
| 5,561,852 A | 10/1996 | Heeschen et al. | |
| 5,570,352 A | 10/1996 | Poyhonen | |
| 5,867,478 A | 2/1999 | Baum et al. | |
| 5,903,841 A | 5/1999 | Kondo | |
| 5,911,120 A | 6/1999 | Jarett et al. | |
| 5,973,963 A | 10/1999 | Sugawara | |
| 6,005,856 A | 12/1999 | Jensen et al. | |
| 6,018,317 A | 1/2000 | Dogan et al. | |
| 6,038,450 A * | 3/2000 | Brink et al. | 455/442 |
| 6,064,692 A | 5/2000 | Chow | |
| 6,078,571 A | 6/2000 | Hall | |
| 6,078,823 A | 6/2000 | Chavez et al. | |
| 6,088,592 A | 7/2000 | Doner et al. | |
| 6,118,805 A | 9/2000 | Bergstrom et al. | |

(Continued)

FOREIGN PATENT DOCUMENTS

| | | |
|---|---|---|
| CA | 2298360 | 8/2005 |
| EP | 0833456 A2 | 4/1998 |
| EP | 1005179 A2 | 5/2000 |
| EP | 1148673 A2 | 10/2001 |
| EP | 1043861 B1 | 6/2002 |

(Continued)

OTHER PUBLICATIONS

International Search Report, PCT/US2007/073541—International Search Authority—European Patent Office, May 21, 2008.

(Continued)

*Primary Examiner* — Meless N Zewdu
*Assistant Examiner* — Mahendra Patel
(74) *Attorney, Agent, or Firm* — Sam Talpalatsky; Michelle Gallardo; Jonathan T. Velasco

(57) ABSTRACT

Methods and apparatus for improved beacon signaling in a wireless communication system are described. Information is encoded in the tone position of the beacon tone. The information encoded may include sector type, sector index and slope index, as well as some time index. The information is coded in the tone position so that any few of several beacons can be decoded in order to decode the information. The methods and apparatus described in the invention improve the robustness against frequency selective fading and do not require wireless terminals to establish synchronization for reliable base station detection.

37 Claims, 11 Drawing Sheets

U.S. PATENT DOCUMENTS

| | | | |
|---|---|---|---|
| 6,131,016 A | 10/2000 | Greenstein et al. | |
| 6,161,000 A | 12/2000 | Yang et al. | |
| 6,275,518 B1 | 8/2001 | Takahashi et al. | |
| 6,282,185 B1 | 8/2001 | Hakkinen et al. | |
| 6,327,468 B1* | 12/2001 | van Iersel et al. | 455/434 |
| 6,337,831 B1 | 1/2002 | Nam | |
| 6,377,566 B1 | 4/2002 | Cupo et al. | |
| 6,377,636 B1 | 4/2002 | Paulraj et al. | |
| 6,385,188 B1 | 5/2002 | Kim et al. | |
| 6,385,462 B1 | 5/2002 | Baum et al. | |
| 6,400,704 B2 | 6/2002 | Mikuni et al. | |
| 6,415,163 B1 | 7/2002 | Keskitalo et al. | |
| 6,473,418 B1 | 10/2002 | Laroia et al. | |
| 6,473,467 B1 | 10/2002 | Wallace et al. | |
| 6,487,416 B1 | 11/2002 | Bundy et al. | |
| 6,512,751 B1 | 1/2003 | Struhsaker et al. | |
| 6,542,485 B1 | 4/2003 | Mujtaba | |
| 6,545,923 B2 | 4/2003 | Sim et al. | |
| 6,587,526 B1 | 7/2003 | Li et al. | |
| 6,647,006 B1 | 11/2003 | Rasanen | |
| 6,647,066 B1 | 11/2003 | Szajnowski | |
| 6,650,590 B2 | 11/2003 | Inaba et al. | |
| 6,661,771 B1 | 12/2003 | Cupo et al. | |
| 6,665,277 B1 | 12/2003 | Sriram | |
| 6,711,120 B1 | 3/2004 | Laroia et al. | |
| 6,711,208 B2 | 3/2004 | Razoumov et al. | |
| 6,751,444 B1 | 6/2004 | Meiyappan | |
| 6,760,587 B2 | 7/2004 | Holtzman et al. | |
| 6,768,714 B1 | 7/2004 | Heinonen et al. | |
| 6,810,254 B2 | 10/2004 | Tiedemann, Jr. | |
| 6,954,481 B1 | 10/2005 | Laroia et al. | |
| 6,961,364 B1 | 11/2005 | Laroia et al. | |
| 6,985,498 B2 | 1/2006 | Laroia et al. | |
| 7,133,354 B2 | 11/2006 | Laroia et al. | |
| 7,366,200 B2 | 4/2008 | Laroia et al. | |
| 7,376,172 B2 | 5/2008 | Laroia et al. | |
| 7,386,306 B2 | 6/2008 | Laroia et al. | |
| 7,388,845 B2 | 6/2008 | Laroia et al. | |
| 7,397,838 B2 | 7/2008 | Laroia et al. | |
| 7,415,262 B2 | 8/2008 | Liu et al. | |
| 7,756,002 B2* | 7/2010 | Batra et al. | 370/208 |
| 7,787,401 B2* | 8/2010 | Kinder et al. | 370/310 |
| 7,995,527 B2 | 8/2011 | Li et al. | |
| 2001/0043578 A1 | 11/2001 | Kumar et al. | |
| 2002/0019228 A1 | 2/2002 | McKenna et al. | |
| 2002/0045451 A1 | 4/2002 | Hwang et al. | |
| 2002/0086708 A1 | 7/2002 | Teo et al. | |
| 2002/0122383 A1 | 9/2002 | Wu et al. | |
| 2002/0154705 A1 | 10/2002 | Walton et al. | |
| 2002/0160778 A1 | 10/2002 | Hiramatsu et al. | |
| 2002/0181390 A1 | 12/2002 | Mody et al. | |
| 2003/0013451 A1 | 1/2003 | Walton | |
| 2003/0072255 A1 | 4/2003 | Ma et al. | |
| 2003/0114127 A1 | 6/2003 | Baldwin | |
| 2003/0123425 A1 | 7/2003 | Walton et al. | |
| 2003/0128656 A1 | 7/2003 | Scarpa | |
| 2003/0194029 A1 | 10/2003 | Heinonen et al. | |
| 2004/0106412 A1 | 6/2004 | Laroia et al. | |
| 2004/0151109 A1* | 8/2004 | Batra et al. | 370/208 |
| 2004/0192393 A1 | 9/2004 | Ishihara et al. | |
| 2004/0213326 A1 | 10/2004 | Parizhsky et al. | |
| 2004/0233871 A1 | 11/2004 | Seki et al. | |
| 2004/0259522 A1* | 12/2004 | Alicherry et al. | 455/404.2 |
| 2005/0085214 A1* | 4/2005 | Laroia et al. | 455/403 |
| 2005/0169307 A1* | 8/2005 | Ayyagari et al. | 370/468 |
| 2005/0233746 A1 | 10/2005 | Laroia et al. | |
| 2006/0040701 A1* | 2/2006 | Long et al. | 455/525 |
| 2006/0050625 A1* | 3/2006 | Krasner | 370/208 |
| 2006/0083159 A1 | 4/2006 | Laroia et al. | |
| 2006/0083211 A1 | 4/2006 | Laroia et al. | |
| 2007/0064730 A1* | 3/2007 | Jin et al. | 370/468 |
| 2007/0165728 A1* | 7/2007 | Parizhsky et al. | 375/260 |
| 2007/0242765 A1 | 10/2007 | Parizhisky et al. | |
| 2007/0280167 A1 | 12/2007 | Olexa et al. | |

FOREIGN PATENT DOCUMENTS

| | | |
|---|---|---|
| JP | 8191285 A | 7/1996 |
| JP | 9102980 A | 4/1997 |
| JP | 10242895 A | 9/1998 |
| JP | 10326076 A | 12/1998 |
| JP | 11136178 A | 5/1999 |
| JP | 11234742 A | 8/1999 |
| JP | 11251970 A | 9/1999 |
| JP | 2000503494 | 3/2000 |
| JP | 2000151554 | 5/2000 |
| JP | 2000299680 | 10/2000 |
| JP | 200472663 | 3/2004 |
| JP | 2007533255 | 11/2007 |
| JP | 2008517524 | 5/2008 |
| WO | WO9726742 A1 | 7/1997 |
| WO | WO9859450 A1 | 12/1998 |
| WO | WO0003508 A1 | 1/2000 |
| WO | 2005003860 | 4/2005 |
| WO | WO2005038606 | 4/2005 |
| WO | WO2005109657 | 11/2005 |
| WO | WO2006043939 A2 | 4/2006 |
| WO | 2007121386 | 10/2007 |
| WO | 2007147107 | 12/2007 |

OTHER PUBLICATIONS

Written Opinion, PCT/US2007/073541—International Search Authority—European Patent Office, May 21, 2008.

Fazel, K. et al: "A flexible and High Performance Cellular Mobile Communications System Based on Orthogonal MultiCarrier SSMA" Wireless Personal Communications, Kluwer Academic Publishers, NL, Vo. 2, No. 1/2, 1995, pp. 121-144.

Fernandez-Getino, et al., "Efficient Pilot Patterns for Channel Estimation in OFDM Systems Over HF Channels," VTC—1999—Fal., IEEE VTS 50th, Vehicular Technology Conference, Gateway to the 21st. Century Communication Village, Amsterdam, Sep. 19-22, 1999; pp. 2193-2197; XP000896002, ISBN: 0-7803-5436-2.

Han, D. S., et al: On the Synchronization of MC-CDMA System for Indoor Wireless Communications:, VTC 1999—Fall, IEEE VTS 50th, Vehicular Tec. Conf; Gateway to the 21st Century Comm. Village, Amsterdam, Sep. 19-22, 1999 vol. 2, Conf. 50 pp. 693-697.

Negi, et al., "Pilot Tone Selection for Channel Estimation in a Mobile OFDM System", IEEE Transactions on Consumer Electronics, pp. 1122-1128, 1998.

Reimers, U. "Digital Video Broadcasting", IEEE Communications Magazine, IEEE Service Center, Piscataway, NJ, US vol. 36. No. 6, Jun. 1, 1998, pp. 104-110.

Taiwan Search Report—TW096125890—TIPO—Aug. 5, 2011.

Tufvesson, F. et al., "Pilot Assisted Channel Estimation for OFDM in Mobile Cellular Systems," 1997 IEEE 47th Vehicular Technology Conference, Phoenix, May 4-7, 1997, IEEE Vehicular Technology Conference, NY, IEEE, US vol. 3, Conf. 47.

Wang C. C. et al: "Dynamic Channel Resource Allocation in Frequency Hopped Wireless Communication System", Information Theory, Proceedings, 1994 IEEE International Symposium on Trondheim, Norway 27, Jun. 1-Jul. 1, 1994, NY Jun. 27, 1994 p. 229.

Aue, "Multi-carrier spread spectrum modulation with reduced dynamic range, " IEEE vehicular Technology Conference, Apr. 28-May 4, 1996, pp. 914-917.

Chan-Soo, Hwang, "A Peak Power Reduction Method for Multicarrier Transmission," IEEE International Conference on Communication, Jun. 11-14, 2001, vol. 5, pp. 1496-1500.

Chen, Hong et al., "An Orthogonal Projection-based Approach for PAR Reduction in OFDM," iEEE Communications Letters, May 2002. vil. 6, issue 5, pp. 169-171.

Fong et al.: "Radio Resource Allocation with Interference Avoidance for Fixed Wireless Systems," IEEE Journal on Selected Areas in Communications, vol. 46, No. 6, Jun. 1998, p. 806-818, New York, N.Y.

G.J. Pottie and A.R. Calderbank, "Channel Coding Strategies for Cellular Radio," pp.763-770 of IEEE Transactions on Vehicular Technology, vol. 44, No. 4, Nov. 1995.

Lida, Marubayashi, "Multi-tone combinatory frequency hopping system," IEEE International Symposium on Spread Spectrum Techniques and Applications, Sep. 22-25, 1996, pp. 893-897.

\* cited by examiner

| | BEACON TONE-SYMBOL INDEX SELECTION | |
|---|---|---|
| Beacon segment index | DOUBLE LENGTH BEACON TONE-SYMBOL INDEX WHEN BASE STATION SECTOR ID IS LESS THAN 3 | DOUBLE LENGTH BEACON TONE-SYMBOL INDEX WHEN BASE STATION SECTOR ID IS GREATER THAN OR EQUAL TO 3 |
| 0 | S0[0], if b0=0 else S0[11] | S0[0], if b0=0 else S0[11] |
| 1 | S1[(R0+0) mod 12] | S2[(R1+0) mod 12] |
| 2 | S2[(R1+0) mod 12] | S1[(R0+0) mod 12] |
| 3 | S0[2], if b0=0 else S0[9] | S0[2], if b0=0 else S0[9] |
| 4 | S1[(R0+2) mod 12] | S2[(R1+2) mod 12] |
| 5 | S2[(R1+2) mod 12] | S1[(R0+2) mod 12] |
| 6 | S0[4], if b0=0 else S0[7] | S0[4], if b0=0 else S0[7] |
| 7 | S1[(R0+4) mod 12] | S2[(R1+4) mod 12] |
| 8 | S2[(R1+4) mod 12] | S1[(R0+4) mod 12] |
| 9 | S0[6], if b0=0 else S0[5] | S0[6], if b0=0 else S0[5] |
| 10 | S1[(R0+6) mod 12] | S2[(R1+6) mod 12] |
| 11 | S2[(R1+6) mod 12] | S1[(R0+6) mod 12] |
| 12 | S0[8], if b0=0 else S0[3] | S0[8], if b0=0 else S0[3] |
| 13 | S1[(R0+8) mod 12] | S2[(R1+8) mod 12] |
| 14 | S2[(R1+8) mod 12] | S1[(R0+8) mod 12] |
| 15 | S0[10], if b0=0 else S0[1] | S0[10], if b0=0 else S0[1] |
| 16 | S1[(R0+0) mod 12] | S2[(R1+0) mod 12] |
| 17 | S2[(R1+0) mod 12] | S1[(R0+0) mod 12] |

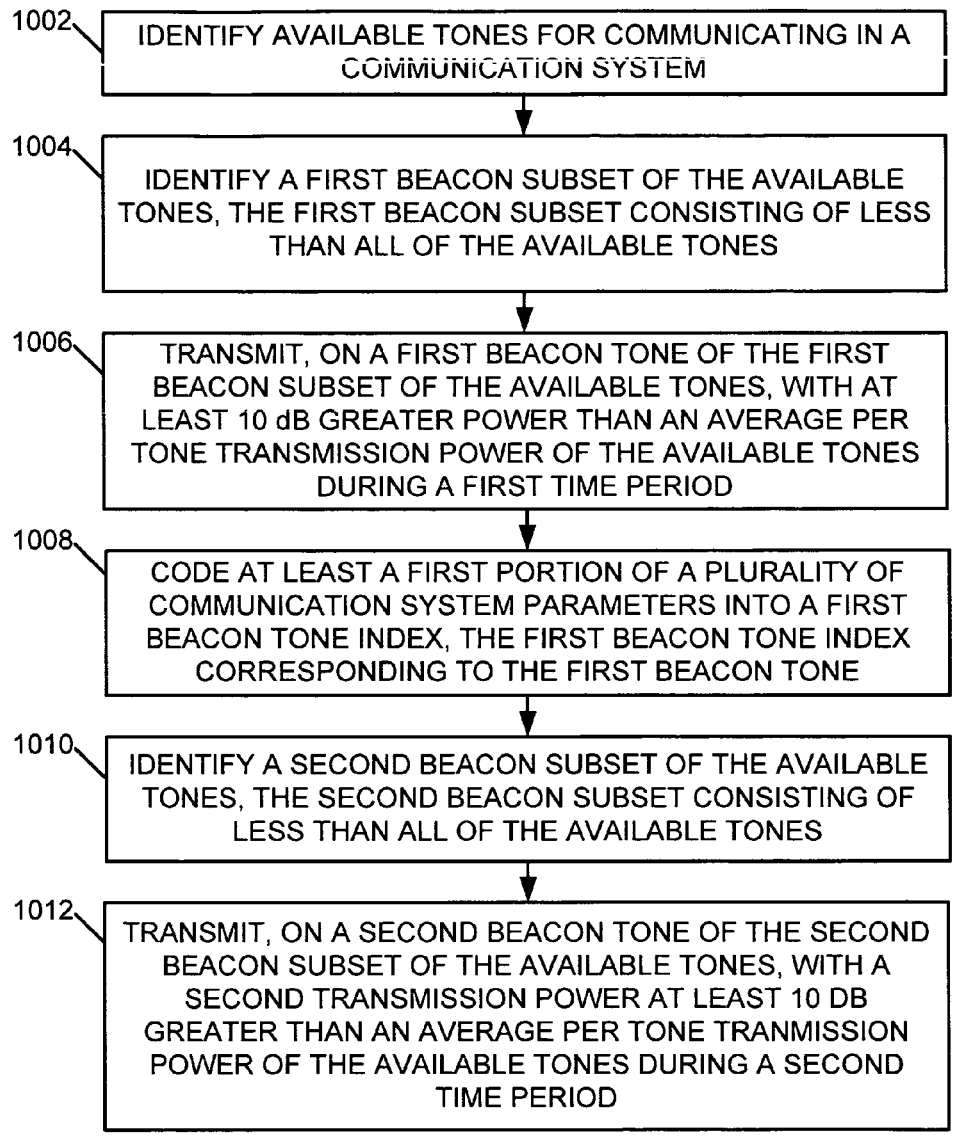

METHOD AND APPARATUS FOR SIGNALING BEACONS IN A COMMUNICATION SYSTEM

RELATED APPLICATIONS

This application relates to the following U.S. patents, which are hereby incorporated by reference herein: U.S. Pat. No. 6,985,498, filed Aug. 13, 2003, entitled "Beacon Signaling in a Wireless System"; U.S. Pat. No. 6,961,364, filed Aug. 18, 2000, entitled "Base Station Identification in Orthogonal Frequency Division Multiplexing Based Spread Spectrum Multiple Access Systems"; and U.S. Pat. No. 6,954,481, filed on Apr. 18, 2000, entitled "Pilot Use in Orthogonal Frequency Division Multiplexing Based Spread Spectrum Multiple Access System".

FIELD

This invention relates to communications system and, more particularly, to methods and apparatus for communicating beacon signals.

BACKGROUND

Communications systems frequently include a plurality of network nodes which are coupled to access nodes, e.g., base stations, through which end nodes, e.g., wireless terminals, are coupled to the network.

In a wireless communication system, quality of service characteristics such as ability to make fast and seamless handoffs, typically require a base station to efficiently transmit the information that allows a wireless terminal to locate the presence of the base station(s) closest to it and obtain some basic information about the base station(s) detected so that it can use the received information to make fast and efficient subsequent access to the base station(s). This information can also be used by service providers for network management (network planning and network monitoring) purposes. In some wireless communication systems signals called beacons are used to communicate base station identification information to the wireless terminals. Usually these beacon signals are not required to carry many information bits. Instead what is typically required for beacons is to be robust to channel impairments and be readily detectable well before the wireless terminal may make a decision to attempt to access the corresponding base station. This feature is very important for the ability to make fast and seamless handoffs. For that purpose beacons are usually transmitted at the relatively high power levels.

Frequently, the problem in designing efficient beacon coding scheme arises from the tradeoffs between simplicity and reliability/detection delay. Frequency selective fading causes some of the beacons to go through very bad channels and as a result these received symbols are extremely noisy. In some systems that may cause the wireless terminals to wait longer until the channel conditions improve and the base station can be identified for access attempt.

Another problem arises from the fact that beacons are typically required to be detected when a wireless terminal is not yet synchronized to the base station which transmitted the beacon signal. In some systems this problem might cause false base station detection, the effect known as "ghosting".

In view of the above discussion, it should be appreciated that there is a need for new and improved ways of communicating beacon signals that are more robust and/or readily decodable in the presence of different channel impairments, e.g., frequency selective fading.

SUMMARY OF THE INVENTION

Improved ways of communicating beacon signals that are more robust in the presence of noise, e.g., frequency selective fading, and when the wireless terminal is not in sync with the base station are described. Encoding and modulating methods and apparatus have improved frequency diversity capabilities. Beacons can be decoded more reliably even when the wireless terminals are not synchronized to the base station thus reducing the "ghosting" problem.

A beacon signal sequence is used to transport a set of information. A beacon signal sequence comprises a sequence of periodical beacon segments, each of which include a radio resource of a number of tones over a certain number of contiguous symbols, for example OFDM symbols. In a beacon segment, one of the tones, referred to as beacon tone, is transmitted at a much higher power than the average power. The frequency location of the beacon tone may vary from one beacon segment to another. In a given beacon segment, the number of tones available for the beacon signal may be smaller than the total number of tones available for the communications system. Moreover, from one beacon segment to another, the set of tones available for the beacon signal may vary.

Information is encoded in the tone position of the beacon tone. The information encoded may include sector type, sector index and slope index, as well as some time index. The information is coded in the tone position so that any few of several beacons can be decoded in order to decode the information.

Additional features and benefits of the present invention are discussed in the detailed description which follows.

BRIEF DESCRIPTION OF THE DRAWINGS

FIG. 9 illustrates a beacon tone-symbol index selection when base station sector ID is less than 3 and a beacon tone-symbol index selection when base station sector ID is greater than or equal to 3.

FIG. 10 illustrates a method for coding and transmitting communication system parameters on beacon tone.

DETAILED DESCRIPTION

The methods and apparatus of the present invention for establishing link and network connections to access nodes used to support communications sessions with one or more end nodes, e.g., wireless terminals, can be used with a wide range of communications systems. For example the invention can be used with systems which support mobile communications devices such as notebook computers equipped with modems, PDAs, and a wide variety of other devices which support wireless interfaces in the interests of device mobility.

Figure 1:
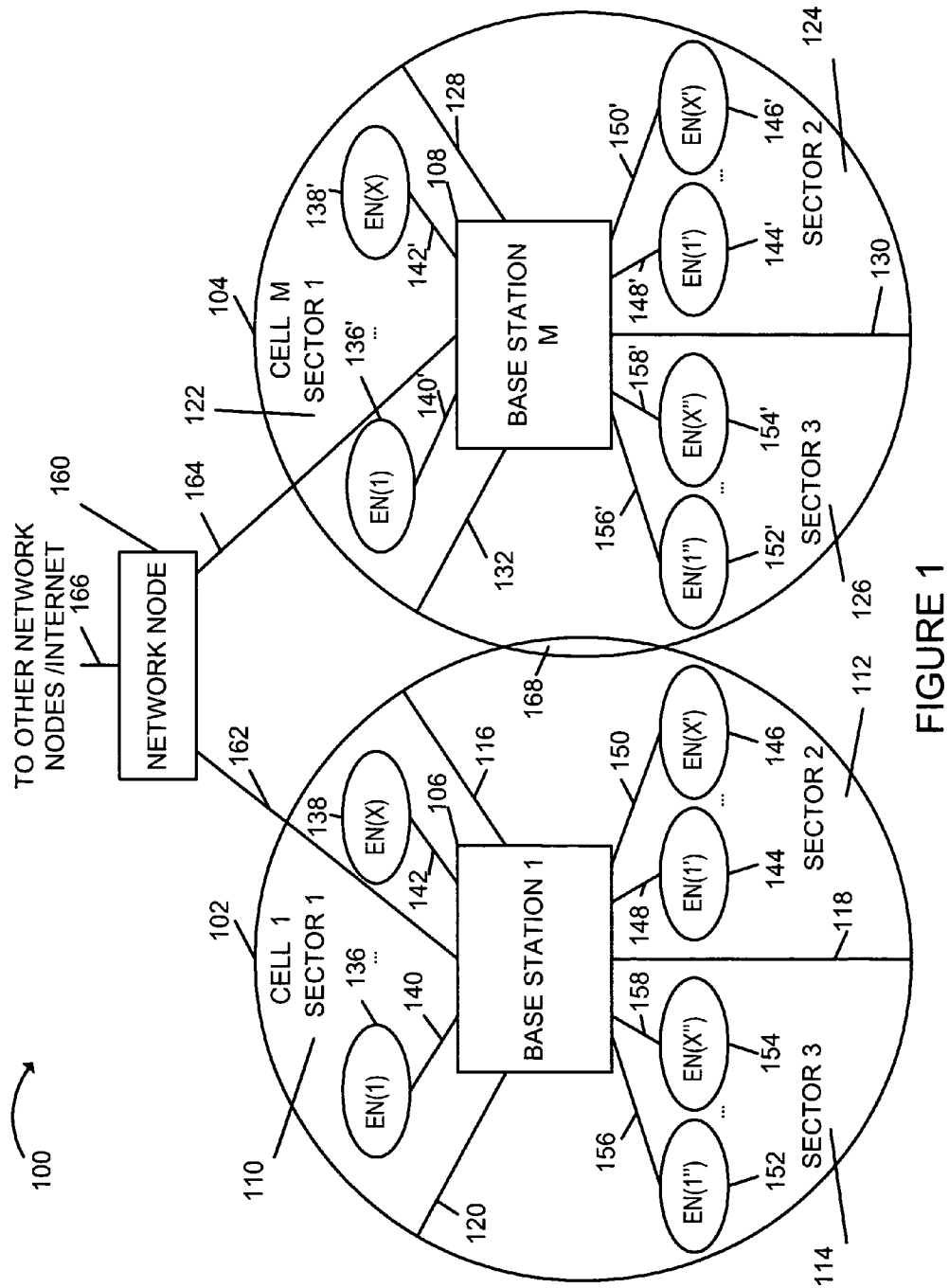
FIG. 1 illustrates a network diagram of an exemplary communications system.

FIG. 1 shows an exemplary communication system 100 implemented including multiple cells: cell 1 102, cell M 104. Note that neighboring cells 102, 104 overlap slightly, as indicated by cell boundary region 168, thereby providing the potential for signal interference between signals being transmitted by base stations in neighboring cells. Each cell 102, 104 of exemplary system 100 includes three sectors. Cells which have not be subdivided into multiple sectors (N=1), cells with two sectors (N=2) and cells with more than 3 sectors (N>3) are also possible. Cell 102 includes a first sector, sector 1 110, a second sector, sector 2 112, and a third sector, sector 3 114. Each sector 110, 112, 114 has two sector boundary regions; each boundary region is shared between two adjacent sectors. Sector boundary regions provide the potential for signal interference between signals being transmitted by base stations in neighboring sectors. Line 116 represents a sector boundary region between sector 1 110 and sector 2 112; line 118 represents a sector boundary region between sector 2 112 and sector 3 114; line 120 represents a sector boundary region between sector 3 114 and sector 1 110. Similarly, cell M 104 includes a first sector, sector 1 122, a second sector, sector 2 124, and a third sector, sector 3 126. Line 128 represents a sector boundary region between sector 1 122 and sector 2 124; line 130 represents a sector boundary region between sector 2 124 and sector 3 126; line 132 represents a boundary region between sector 3 126 and sector 1 122. Cell 1 102 includes a base station (BS), base station 1 106, and a plurality of end nodes (ENs) in each sector 110, 112, 114. Sector 1 110 includes EN(1) 136 and EN(X) 138 coupled to BS 106 via wireless links 140, 142, respectively; sector 2 112 includes EN(1') 144 and EN(X') 146 coupled to BS 106 via wireless links 148, 150, respectively; sector 3 126 includes EN(1") 152 and EN(X") 154 coupled to BS 106 via wireless links 156, 158, respectively. Similarly, cell M 104 includes base station M 108, and a plurality of end nodes (ENs) in each sector 122, 124, 126. Sector 1 122 includes EN(1) 136' and EN(X) 138' coupled to BS M 108 via wireless links 140', 142', respectively; sector 2 124 includes EN(1') 144' and EN(X') 146' coupled to BS M 108 via wireless links 148', 150', respectively; sector 3 126 includes EN(1") 152' and EN(X") 154' coupled to BS 108 via wireless links 156', 158', respectively. System 100 also includes a network node 160 which is coupled to BS 1 106 and BS M 108 via network links 162, 164, respectively.

Network node 160 is also coupled to other network nodes, e.g., other base stations, AAA server nodes, intermediate nodes, routers, etc. and the Internet via network link 166. Network links 162, 164, 166 may be, e.g., fiber optic cables. Each end node, e.g. EN 1 136 may be a wireless terminal including a transmitter as well as a receiver. The wireless terminals, e.g., EN(1) 136 may move through system 100 and may communicate via wireless links with the base station in the cell in which the EN is currently located. The wireless terminals, (WTs), e.g. EN(1) 136, may communicate with peer nodes, e.g., other WTs in system 100 or outside system 100 via a base station, e.g. BS 106, and/or network node 160. WTs, e.g., EN(1) 136 may be mobile communications devices such as cell phones, personal data assistants with wireless modems, etc. Each base station performs tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine the tones that they can use to receive data and information at specific strip-symbol periods. The tone subset allocation sequence is constructed to spread the inter-sector and inter-cell interference across each of the tones.

Figure 2:
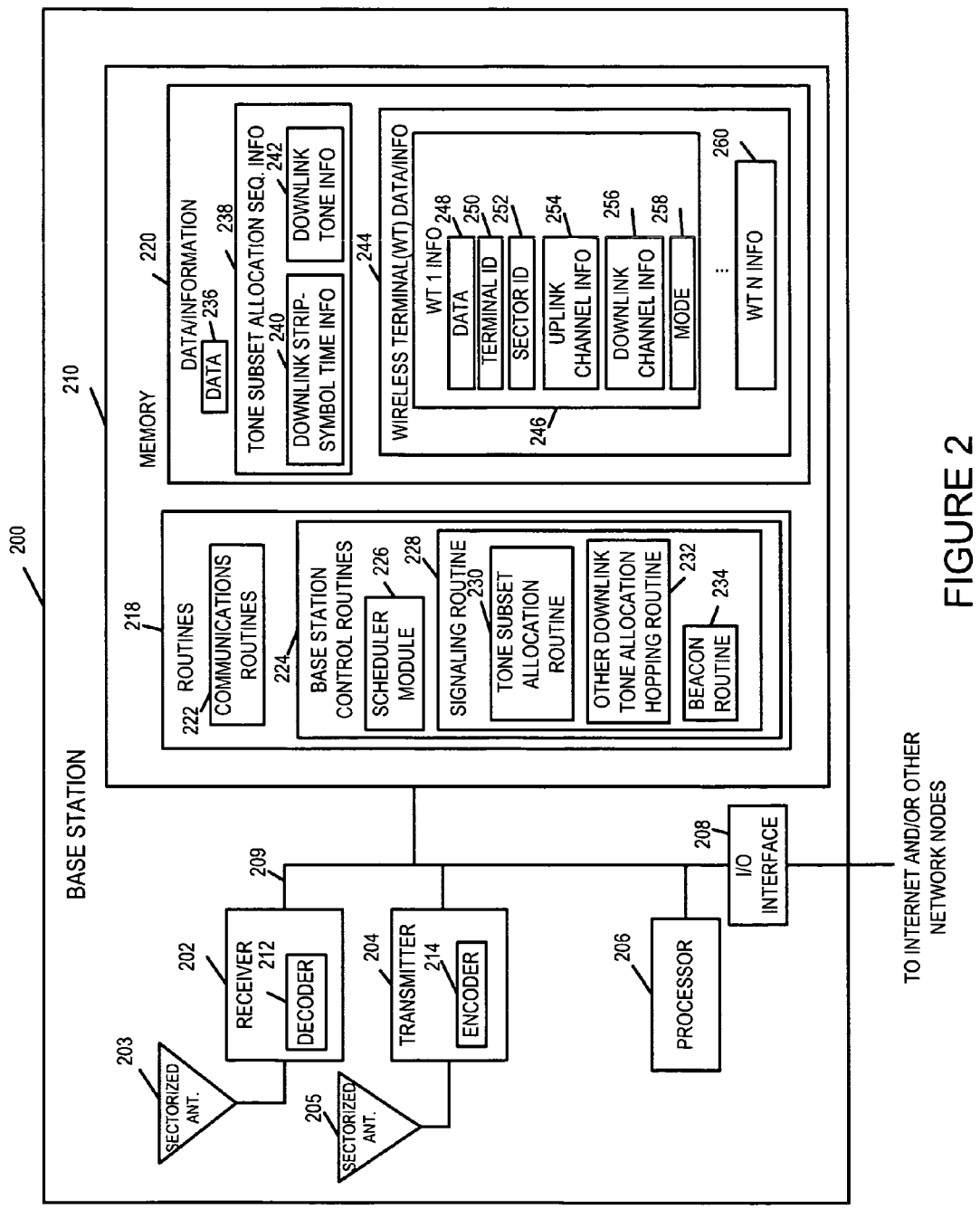
FIG. 2 illustrates an exemplary end node.

FIG. 2 illustrates an exemplary base station 200. Exemplary base station 200 implements the tone subset allocation sequences, with different tone subset allocation sequences generated for each different sector type of the cell. The base station 200 may be used as any one of the base stations 106, 108 of the system 100 of FIG. 1. The base station 200 includes a receiver 202, a transmitter 204, a processor 206, e.g., CPU, an input/output interface 208 and memory 210 which are coupled together by a bus 209 over which the various elements 202, 204, 206, 208, and 210 may interchange data and information.

Sectorized antenna 203 coupled to receiver 202 is used for receiving data and other signals, e.g., channel reports, from wireless terminals transmissions from each sector within the base station's cell. Sectorized antenna 205 coupled to transmitter 204 is used for transmitting data and other signals, e.g., control signals, pilot signal, beacon signals, etc. to wireless terminals 300 (see FIG. 3) within each sector of the base station's cell. In various embodiments of the invention, base station 200 may employ multiple receivers 202 and multiple transmitters 204, e.g., an individual receivers 202 for each sector and an individual transmitter 204 for each sector. The processor 206, may be, e.g., a general purpose central processing unit (CPU). Processor 206 controls operation of the base station 200 under direction of one or more routines 218 stored in memory 210. I/O interface 208 provides a connection to other network nodes, coupling the BS 200 to other base stations, access routers, AAA server nodes, etc., other networks, and the Internet. Memory 210 includes routines 218 and data/information 220.

Data/information 220 includes data 236, tone subset allocation sequence information 238 including downlink strip-symbol time information 240 and downlink tone information 242, and wireless terminal (WT) data/info 244 including a plurality of sets of WT information: WT 1 info 246 and WT N info 260. Each set of WT info, e.g., WT 1 info 246 includes data 248, terminal ID 250, sector ID 252, uplink channel information 254, downlink channel information 256, and mode information 258.

Routines 218 include communications routines 222 and base station control routines 224. Base station control routines 224 includes a scheduler module 226 and signaling routines 228 including a tone subset allocation routine 230 for the strip-symbol periods, other downlink tone allocation hopping routine 232 for the rest of symbol periods, e.g., non strip-symbol periods, and a beacon routine 234.

Data 236 includes data to be transmitted that will be sent to encoder 214 of transmitter 204 for encoding prior to transmission to WTs, and received data from WTs that has been processed through decoder 212 of receiver 202 following reception. Downlink strip-symbol time information 240 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 242 includes information including a carrier frequency assigned to the base station 200, the number and frequency of tones, and the set of tone subsets to be allocated to the strip-symbol periods, and other cell and sector specific values such as slope, slope index and sector type.

Data 248 may include data that WT1 300 has received from a peer node, data that WT 1 300 desires to be transmitted to a peer node, and downlink channel quality report feedback information. Terminal ID 250 is a base station 200 assigned ID that identifies WT 1 300. Sector ID 252 includes information identifying the sector in which WT1 300 is operating. Sector ID 252 can be used, for example, to determine the sector type. Uplink channel information 254 includes information identifying channel segments that have been allocated by scheduler 226 for WT1 300 to use, e.g., uplink traffic channel segments for data, dedicated uplink control channels for requests, power control, timing control, etc. Each uplink channel assigned to WT1 300 includes one or more logical tones, each logical tone following an uplink hopping sequence. Downlink channel information 256 includes information identifying channel segments that have been allocated by scheduler 226 to carry data and/or information to WT1 300, e.g., downlink traffic channel segments for user data. Each downlink channel assigned to WT1 300 includes one or more logical tones, each following a downlink hopping sequence. Mode information 258 includes information identifying the state of operation of WT1 300, e.g. sleep, hold, on.

Communications routines 222 control the base station 200 to perform various communications operations and implement various communications protocols. Base station control routines 224 are used to control the base station 200 to perform basic base station functional tasks, e.g., signal generation, reception, and scheduling, including transmitting signals to wireless terminals using the tone subset allocation sequences of the present invention during the strip-symbol periods.

Signaling routine 228 controls the operation of receiver 202 with its decoder 212 and transmitter 204 with its encoder 214. The signaling routine 228 is responsible controlling the generation of transmitted data 236 and control information. Tone subset allocation routine 230 constructs the tone subset to be used in a strip-symbol period and data/info 220 including downlink strip-symbol time info 240 and sector ID 252. The downlink tone subset allocation sequences will be different for each sector type in a cell and different for adjacent cells. The WTs 300 receive the signals in the strip-symbol periods in accordance with the downlink tone subset allocation sequences; the base station 200 uses the same downlink tone subset allocation sequences in order to generate the transmitted signals. Other downlink tone allocation hopping routine 232 constructs downlink tone hopping sequences, using information including downlink tone information 242, and downlink channel information 256, for the symbol periods other than the strip-symbol periods. The downlink data tone hopping sequences are synchronized across the sectors of a cell. Beacon routine 234 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 3:
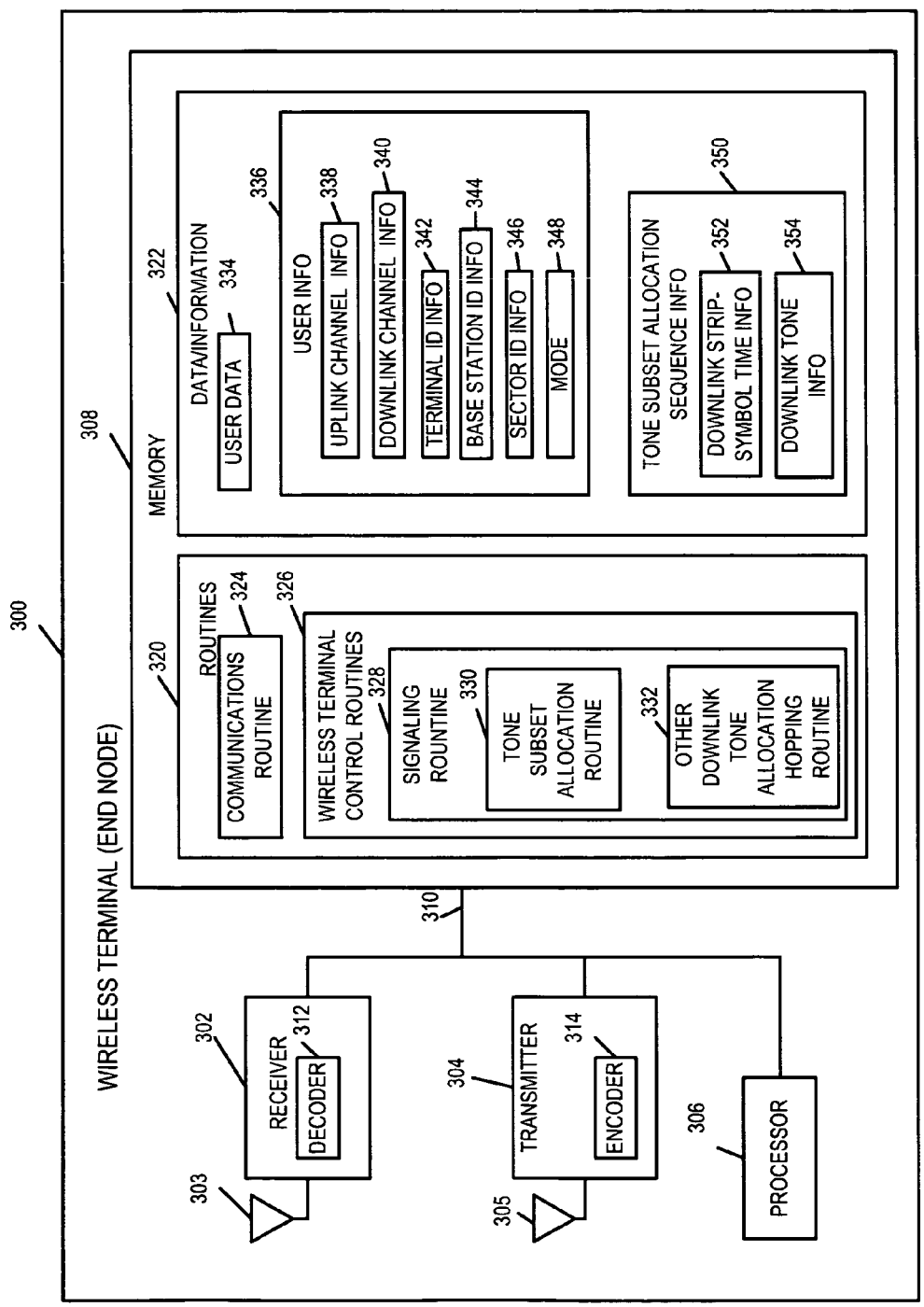
FIG. 3 illustrates an exemplary access node.

FIG. 3 illustrates an exemplary wireless terminal (end node) 300 which can be used as any one of the wireless terminals (end nodes), e.g., EN(1) 136, of the system 100 shown in FIG. 1. Wireless terminal 300 implements the tone subset allocation sequences. The wireless terminal 300 includes a receiver 302 including a decoder 312, a transmitter 304 including an encoder 314, a processor 306, and memory 308 which are coupled together by a bus 310 over which the various elements 302, 304, 306, 308 can interchange data and information. An antenna 303 used for receiving signals from a base station 200 is coupled to receiver 302. An antenna 305 used for transmitting signals, e.g., to base station 200 is coupled to transmitter 304.

The processor 306, e.g., a CPU controls the operation of the wireless terminal 300 by executing routines 320 and using data/information 322 in memory 308.

Data/information 322 includes user data 334, user information 336, and tone subset allocation sequence information 350. User data 334 may include data, intended for a peer node, which will be routed to encoder 314 for encoding prior to transmission by transmitter 304 to base station 200, and data received from the base station 200 which has been processed by the decoder 312 in receiver 302. User information 336 includes uplink channel information 338, downlink channel information 340, terminal ID information 342, base station ID information 344, sector ID information 346, and mode information 348. Uplink channel information 338 includes information identifying uplink channels segments that have been assigned by base station 200 for wireless terminal 300 to use when transmitting to the base station 200. Uplink channels may include uplink traffic channels, dedicated uplink control channels, e.g., request channels, power control channels and timing control channels. Each uplink channel include one or more logic tones, each logical tone following an uplink tone hopping sequence in accordance with the present invention. The uplink hopping sequences are different between each sector type of a cell and between adjacent cells. Downlink channel information 340 includes information identifying downlink channel segments that have been assigned by base station 200 to WT 300 for use when BS 200 is transmitting data/information to WT 300. Downlink channels may include downlink traffic channels and assignment channels, each downlink channel including one or more logical tone, each logical tone following a downlink hopping sequence, which is synchronized between each sector of the cell.

User info 336 also includes terminal ID information 342, which is a base station 200 assigned identification, base station ID information 344 which identifies the specific base station 200 that WT has established communications with, and sector ID info 346 which identifies the specific sector of the cell where WT 300 is presently located. Base station ID 344 provides a cell slope value and sector ID info 346 provides a sector index type; the cell slope value and sector index type may be used to derive the uplink tone hopping sequences in accordance with the invention. Mode information 348 also included in user info 336 identifies whether the WT 300 is in sleep mode, hold mode, or on mode.

Tone subset allocation sequence information 350 includes downlink strip-symbol time information 352 and downlink tone information 354. Downlink strip-symbol time information 352 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 354 includes information including a carrier frequency assigned to the base station 200, the number and frequency of tones, and the set of tone subsets to be allocated to the strip-symbol periods, and other cell and sector specific values such as slope, slope index and sector type.

Routines 320 include communications routines 324 and wireless terminal control routines 326. Communications routines 324 control the various communications protocols used by WT 300. Wireless terminal control routines 326 controls basic wireless terminal 300 functionality including the control of the receiver 302 and transmitter 304. Wireless terminal control routines 326 include the signaling routine 328. The signaling routine 328 includes a tone subset allocation routine 330 for the strip-symbol periods and an other downlink tone allocation hopping routine 332 for the rest of symbol periods, e.g., non strip-symbol periods. Tone subset allocation routine 330 uses user data/info 322 including downlink channel information 340, base station ID info 344, e.g., slope index and sector type, and downlink tone information 354 in order to generate the downlink tone subset allocation sequences in accordance with the present invention and process received data transmitted from base station 200. Other downlink tone allocation hopping routine 330 constructs downlink tone hopping sequences, using information including downlink tone information 354, and downlink channel information 340, for the symbol periods other than the strip-symbol periods. Tone subset allocation routine 330, when executed by processor 306, is used to determine when and on which tones the wireless terminal 300 is to receive one or more strip-symbol signals from the base station 200. The uplink tone allocation hopping routine 330 uses a tone subset allocation function, implemented in accordance with the present invention, along with information received from the base station 200, to determine the tones in which it should transmit on.

Figure 4:
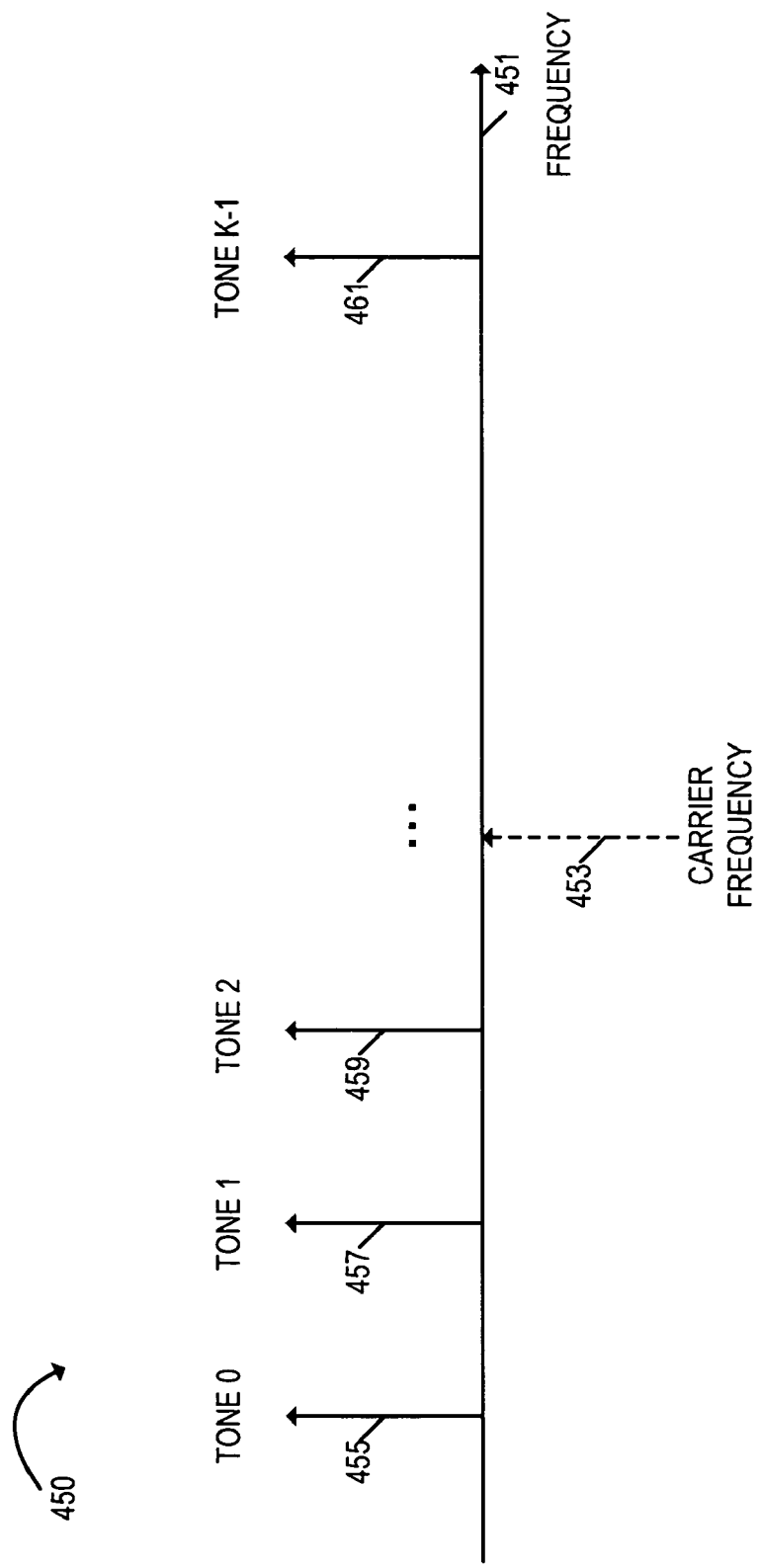
FIG. 4 illustrates an exemplary OFDM spread spectrum air interface technology.

FIG. 4 illustrates an exemplary OFDM spread spectrum air interface technology, implemented for each sector of each of the cells (102,104) of FIG. 1. In FIG. 4, horizontal axis 451 represents frequency. The total amount of available bandwidth for a particular carrier frequency 453, e.g., for uplink signaling for downlink signaling, is divided into a number, K, of equally spaced tones. In some embodiments, there are 113 equally spaced tones. These tones are indexed from 0 to K-1. Exemplary tones: tone 0 455, tone 1 457, tone 2 459 and tone K-1 461 are illustrated in FIG. 4. The bandwidth is used simultaneously each of the sectors 110, 112, 114, 122, 124, 126 comprising the two cells 102, 104. In each sector of each cell, the tones, 0 through K-1, are used in each sector of each cell respectively to transmit downlink signals. Since the same bandwidth is used in each sector of both the cells 102, 104, the signals transmitted by different cells and sectors on the frequency tones at the same time may interfere with each other, e.g., in the overlapping coverage areas, e.g. sector boundary areas 116, 118, 120, 128, 130, 132, and cell boundary areas 168.

Figure 5:
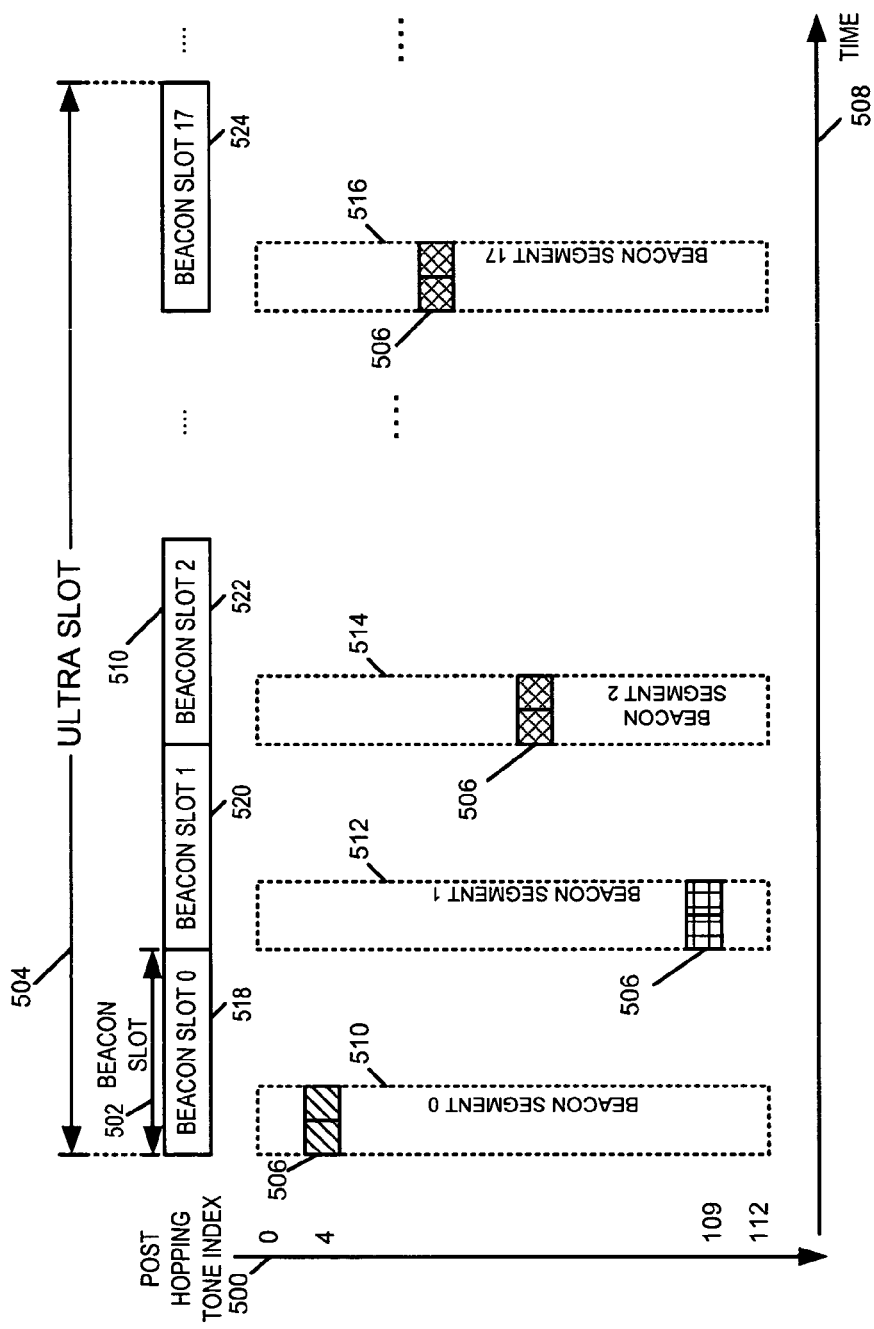
FIG. 5 illustrates the periodicity of beacon segments.

Beacons are transmitted, in an exemplary embodiment, via a dedicated channel known as a broadcast beacon channel. FIG. 5 illustrates the periodicity of beacon symbols for an exemplary embodiment. In FIG. 5 exemplary beacon signals 506 are plotted on drawing 501. Drawing 501 includes a vertical axis 500 indicating post hopping tone index vs. a horizontal axis 508 indicating time. The post hopping tone index shows the physical frequency location of a particular tone. In an exemplary embodiment, the post-hopping tone index covers a range of 0 to 112 corresponding to 113 contiguous tones of an exemplary downlink tone block used by a base station sector transmitter. Those 113 tones are available for the base station transmitter to transport information to the wireless terminals. In some embodiments of the invention the available resource for the broadcast beacon channel are beacon segments, each comprising 113 tones over 2 successive OFDM symbols. Define a tone-symbol to be the air link resource of a single tone for the duration of one OFDM symbol transmission time period and a double tone-symbol to be the air link resource of a single tone for the duration of two successive OFDM symbol transmission time periods. In each such exemplary beacon segment, there are totally 113 double tone-symbols, which are numbered according to the post hopping tone index of axis 500. The beacon segments are transmitted during the downlink strip channel periodically once every 8 super slots. Each such exemplary super slot comprises 114 consecutive OFDM symbol transmission time periods including two downlink strip channel OFDM symbol transmission time periods. A beacon segment corresponds to the strip channel OFDM symbol time periods of one of the super slots of the beacon slot, e.g., one of the first, second or third super slots of the beacon slot. Drawing 501 includes exemplary beacon segments (beacon segment 0 510, beacon segment 1 512, beacon segment 2 514, . . . , beacon segment 17 516) corresponding to exemplary beacon slots (beacon slot 0 518, beacon slot 1 520, beacon slot 2 522, . . . , beacon slot 17 524), respectively. The duration of 8 super slots comprises one beacon slot period 502, e.g., 912 OFDM symbol transmission time periods. In this exemplary embodiment, each beacon slot includes one beacon segment corresponding to the air link resources used to transmit a beacon signal. In a beacon segment, a base station sector transmitter transmits one double tone-symbol 506, called double beacon tone-symbol, at a much higher power than the average per tone-symbol power. The tone corresponding to the double beacon tone-symbol is called beacon tone in the beacon segment. In one embodiment, all the other double tone-symbols in the beacon segment are transmitted at much (e.g., at least 10 dB) lower average power than the beacon double tone-symbol.

In some embodiments, at least some of the base station sector transmitters use multiple, e.g. 3, tone blocks, and some such base station sector transmitter transmits a single double beacon tone-symbol signal 506 in each of the tone blocks once per beacon slot 502. For example, consider a base station sector transmitter using three downlink tone blocks with each tone block comprising 113 contiguous tones. During each beacon slot, e.g., exemplary beacon slot 0 518, the base station sector transmitter transmits: (i) a first double beacon tone-symbol signal during the two OFDM strip symbols of the first super slot of the beacon slot for a first beacon segment, (ii) a second double beacon tone-symbol signal during the two OFDM strip symbols of the second super slot of the beacon slot for a second beacon segment, and (iii) a third double beacon tone-symbol signal during the two OFDM strip symbols of the third super slot of the beacon slot for a third beacon segment.

In this exemplary embodiment of FIG. 5, one ultra slot 504 comprises eighteen beacon slots (beacon slot 0 518, beacon slot 1 520, beacon slot 2 522, . . . , beacon slot 17 524). The beacon tone-symbols signals follow a pattern that corresponds to the beacon segments numbered from 0 to 17 which repeats every ultra slot 504. Within an ultra slot 504, the 18 beacon slots are indexed by a time index 0, 1, . . . , 17. It should be noted that FIG. 5 is not drawn to scale; each exemplary beacon signal 506 is one tone wide, each exemplary beacon segment is two OFDM symbol transmission time periods in duration, and each exemplary beacon slot is 912 OFDM symbol transmission time periods in duration.

A double length beacon tone-symbol signal is generated differently from regular OFDM tone-symbols. Unlike regular OFDM tone-symbols, a double length beacon tone-symbol signal does not have phase discontinuity at the OFDM symbol boundary. It can be viewed as a regular length OFDM symbol with cyclic extension that spans the subsequent OFDM symbol. This is illustrated in FIG. 6.

Figure 6:
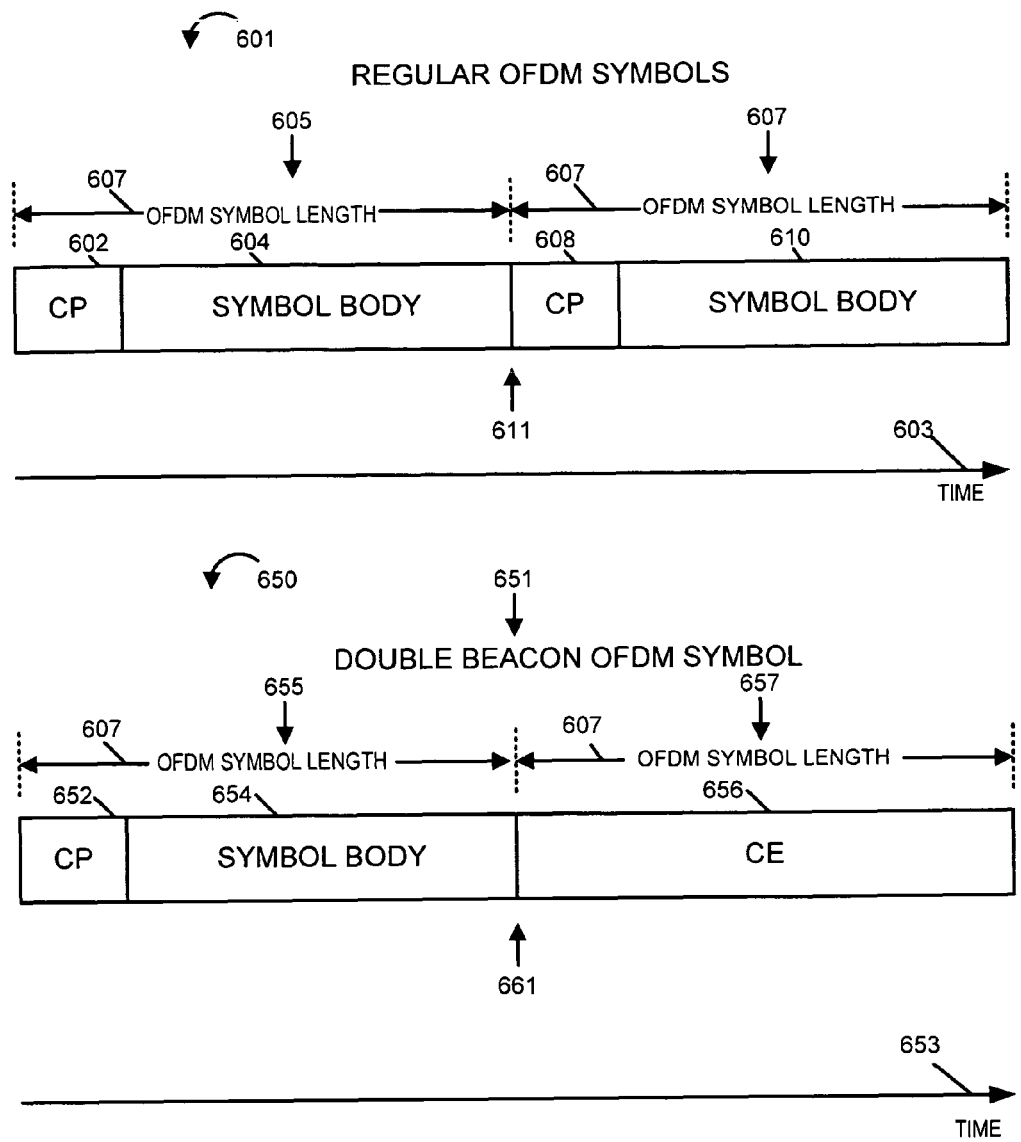
FIG. 6 illustrates double length beacon tone-symbol timing diagram.

The first part 601 of FIG. 6 shows two regular OFDM symbols (603, 605). The horizontal axis 603 of FIG. 6 represents the time. Each of the exemplary regular OFDM symbols (605, 607) has an OFDM symbol transmission time duration 609. Each regular OFDM symbol (605, 607) comprises two parts, a cyclic prefix (CP) portion and a symbol body portion. For example, exemplary first regular OFDM symbol 605 comprises CP 602 and symbol body 604; exemplary second regular OFDM symbol 607 comprises CP 608 and symbol body 610. Note that typically the symbol bodies (604, 610) are constructed using certain constellation, such as QPSK and as a result, there is a phase discontinuity at the time instance 611 when the first OFDM symbol 605 ends and when the second OFDM symbol 607 starts.

The second part 650 of FIG. 6 shows the construction of a special double OFDM symbol 651 including a first OFDM symbol 655 and a second OFDM symbol 657. The horizontal axis 653 represents time. Each of the exemplary regular OFDM symbols (653, 657) has an OFDM symbol transmission time duration 607. The construction method used to generate the double beacon signal, which is of 2 OFDM symbol periods, will now be described. The first part 653 of the special double OFDM symbol 651 is constructed in the same way as a regular OFDM symbol 607. First part 653 includes a cyclic prefix portion 652 followed by a symbol body portion 654. The second part 655 of the special double OFDM symbol 651, which follows immediately the first part 653, is a cyclic extension (CE) of the first part 653 of the special double OFDM symbol 651, so that there is no phase discontinuity at the time instance 672 when the first OFDM symbol 655 ends and when the second OFDM symbol 657 starts.

The broadcast beacon channel is used to broadcast information that helps a wireless terminal to determine the presence of the base station and to acquire system parameters such as base station slope index, base station sector index, base station sector ID and beacon segment index.

Information bits are position encoded with the beacon tone-symbols. In this exemplary embodiment for a given tone block 36 tone-symbols are available to be used for beacon signal transmission out of the 113 tone-symbols of an OFDM symbol of a beacon segment, and the remaining 77 tone-symbols are precluded from being used to carry a beacon signal. In some embodiments, the tones corresponding to those 36 tone-symbols are non-contiguous. Furthermore, the tone-symbols can be equally spaced with tone spacing greater than 1.

Figure 7:
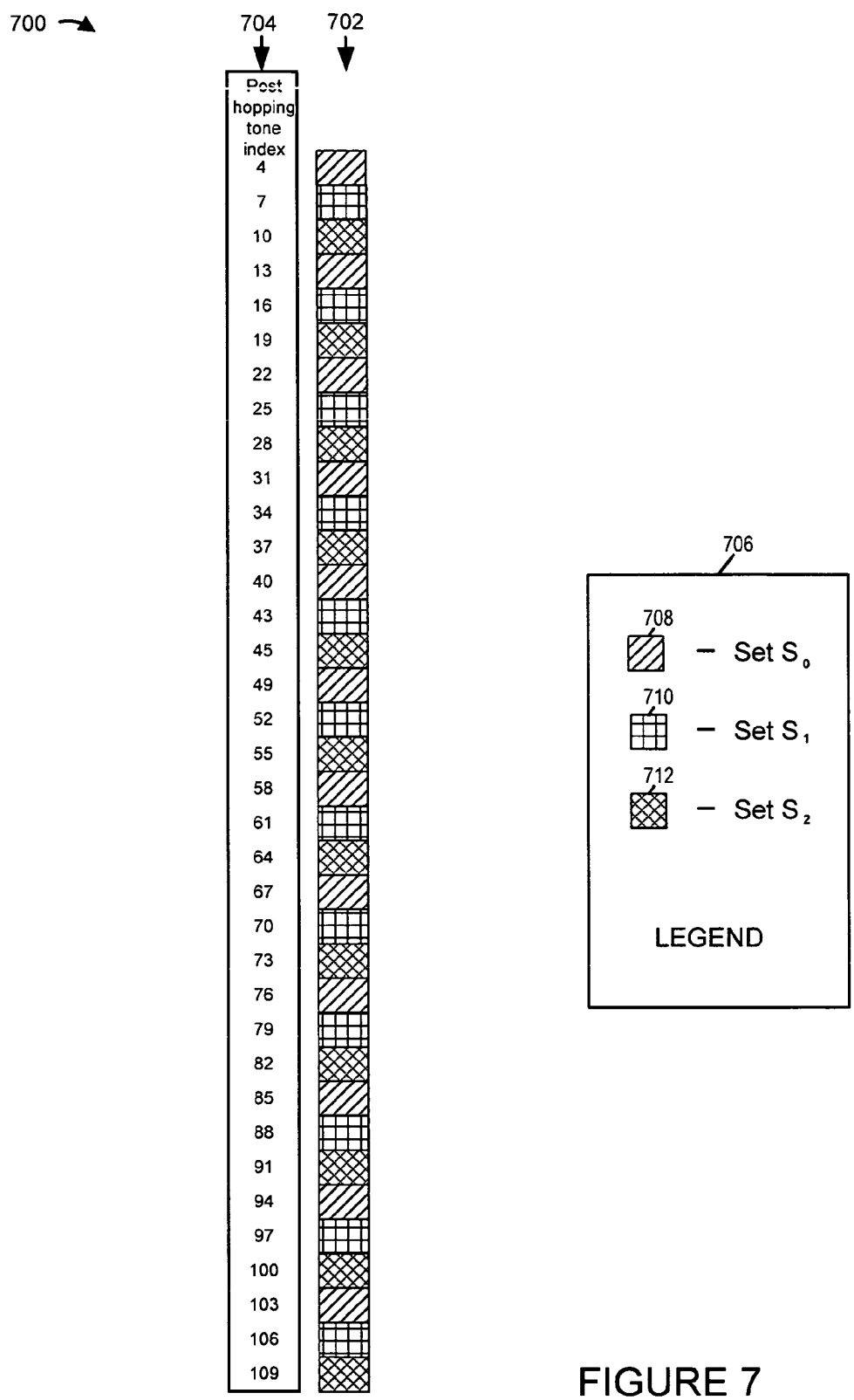
FIG. 7 illustrates a partition of tone-symbols into 3 disjoint subsets of tones used in beacon encoding process.

These 36 tone-symbols, which can be used to carry a beacon signal, are divided into 3 disjoint sets of 12 tone-symbols each (first set S0, second set S1 and third set S2). Drawing 700 of FIG. 7 shows one exemplary mapping. The 36 tone-symbols 702 are indexed using post-hopping tone indexing as indicated in block 700. Legend 706 indicates that: (i) tone-symbols 708 corresponding to set S0 are designated by diagonal line shading; (ii) tone-symbols 710 corresponding to set S1 are designated by vertical and horizontal line shading; and (iii) tone-symbols 712 corresponding to set S2 are designated by crosshatch shading. Tone-symbols with post hopping tone index values 4, 13, 22, 31, 40, 49, 58, 67, 76, 85, 94, 103 are used for S0. The members of set S0 are indexed such that: S0[0] corresponds to tone 4, S0[1] corresponds to tone 13, . . . , S0[12] corresponds to tone 103. Tone-symbols with post hopping tone index values 7, 16, 25, 34, 43, 52, 61, 70, 79, 88, 97, 106 are used for S1. The members of set S1 are indexed such that: S1[0] corresponds to tone 7, S1[1] corresponds to tone 16, . . . , S1[12] corresponds to tone 106. Tone-symbols with post hopping tone index values 10, 19, 28, 37, 46, 55, 64, 73, 82, 91, 100, 109 are used for S2. The members of set S2 are indexed such that: S2[0] corresponds to tone 10, S2[1] corresponds to tone 19, . . . , S2[19] corresponds to tone 109. This mapping structures the beacon tone spacing such that tone spacing between any two candidate beacon tone-symbols in a given set of 36 tone-symbols corresponding to a tone block is at least 3 tones. This mapping further structures the beacon tone spacing such that tone spacing between any two candidate beacon tone-symbols in a given set of 12 tone-symbols, e.g., set S0, set S1 or set S2, is at least 9 tones. Significant spacing (in tones) between tones in a set, e.g., at least 3 tones, helps reduce or minimize leakage from one beacon tone-symbol signal to another when the wireless terminal is not synchronized to the base station. In other words, significant spacing tends to reduce or eliminate the "ghosting" problem.

The exemplary beacon tone position coding method presented below encodes base station identification information using some hopping (rather than static); this technique provides frequency diversity and allows the wireless terminal to determine beacon slot index from the hopping pattern. This can be seen from FIG. 5 where beacon tone-symbols 506 in the ultra slot period 504 hop across post hopping tones between index 4 and index 109.

Beacon tone position coding will now be described. First we calculate the integer number N=3*slope_index+sector_type_index, where slope_index is an integer number in the range [0;95] and sector_type_index is an integer number in the range [0;2]. The range 0 to 95 can be used, for example, in a communication system having 96 beacon slope indexes (slope_index). The range 0 to 2 can be used, for example, in a communication system having 3 sector types. For example, sector_type_index=sector ID mod 3, where sector ID=0, 1, . . . , 5. The choice of these parameters is determined by exemplary communication system basic parameters and provides the encoding of 96 distinct slopes each deployed in 3 distinct sector types. Second, number N is used to calculate integer numbers R1, R0 and b0 as follows: b0=N mod 2; R0=(N−b0)/2 mod 12; and R1=floor(N/24).

The post hopping tone index for each beacon segment is determined as follows. First consider the case when exemplary base station sector ID is less than 3. Denote "s" to be the time index variable indexing a beacon slot within an ultra slot. So s=0, 1, . . . 17. In a beacon segment s where s mod 3=0, the post hopping tone index of the double length beacon tone-symbol is set to one of the tones in set S0: S0[2*floor(s/3)], if b0=0, or S0[11−2*floor(s/3)], if b0=1. In a segment s where s mod 3=1, the post hopping tone index of the double length beacon tone-symbol is set to one of the tones in set S1: S1[mod(R0+2*floor(s/3),12)]. In a segment s where s mod 3=2, the post hopping tone index of the double length beacon tone-symbol is set to one of the tones in set S2: S2[mod(R1+2*floor(s/3),12)].

Figure 8:
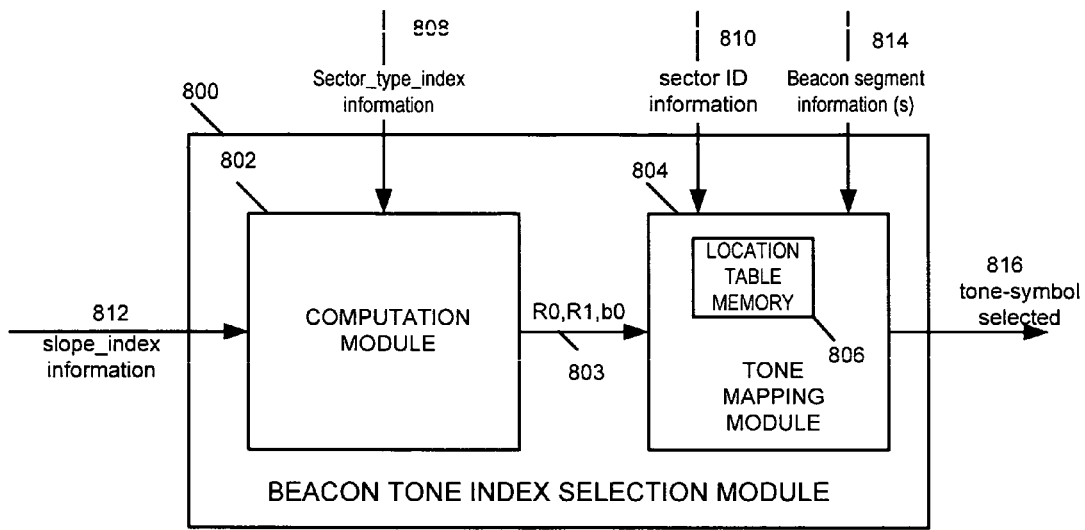
FIG. 8 illustrates a module that determines the tone-symbols used for beacon transmission.

FIG. 8 illustrates the process of selecting the tone-symbol index for the broadcast beacon channel. Beacon tone index selection module 800 selects the final tone-symbol 816 based on slope index information 812 (that can, for example, take 96 distinct values [0;95]) and sector type index information 808 (that can, for example, take 3 distinct values 0,1,2). Beacon tone index selection module may be or may be a part of beacon routine 234. The selection procedure includes two steps. In a first step, computation module 802 produces information set 803, the parameters b0, R0, R1 according to the equations above.

In a second step given the sector ID information 810 (that can, for example, take 6 distinct values [0;5]) and beacon slot index information 814 (that can, for example, take 18 distinct values [0,17]) as well as computed values b0, R0, R1 the Tone Mapping Module 804 chooses the output tone-symbol index 816. The tone-symbol indexes corresponding to the sets S0, S1 and S2 are stored, e.g. in a memory 806.

FIG. 9 includes a table 900 illustrating an exemplary double length beacon tone-symbol index selection process for every beacon segment in an ultra slot corresponding to a downlink tone block being used by an exemplary base station sector transmitter. Table 900 includes: a first column 902 identifying beacon segment index within the ultraslot, a second column 904 including information used to identify the double length beacon tone-symbol index when the base station sector ID is less than 3, and a third column 906 including information used to identify the double length beacon tone-symbol index when the base station sector ID is greater than or equal to 3.

Column 904 is used if base station sector ID values equal to 0, 1, or 2. Column 904 shows which beacon symbol tone index is chosen for transmission in a given beacon segment identified in column 902 given parameters b0, R0 and R1. The presented pattern represented by column 904 repeats for every subsequent ultra slot.

Now consider the case where base station sector ID is greater than or equal to 3. In a segment s where s mod 3=0, the post hopping tone index of the double length beacon tone-symbol is set to one of the tones in set S0: S0[2*floor(s/3)], if b0=0, or S-[11−2*floor(s/3)], if b0=1. In a segment s where s mod 3=1, the post hopping tone index of the double length beacon tone-symbol is set to one of the tones in set S2: S2[mod(R1+2*floor(s/3),12)]. In a segment s where s mod 3=2, the post hopping tone index of the double length beacon tone-symbol is set to one of the tones in set S1: S1[mod(R0+2*floor(s/3),12)].

FIG. 9 illustrates the double length beacon tone-symbol index selection process for every beacon segment 902 in an ultra slot when base station sector ID is greater than or equals 3 in column 906. Column 906 is used for base station sector ID values greater than or equal to 3, e.g., 3, 4, 5. Column 906 shows which beacon symbol tone index is chosen for transmission in a given beacon segment identified in column 902 given parameters b0, R0 and R1. The presented pattern represented by column 906 repeats for every subsequent ultra slot.

FIG. 9 demonstrates that beacon tones transmitted across the ultra slot hop over the frequency band thus providing frequency diversity and therefore increased robustness to the frequency selective fading. For example, assume the following inputs: slope_index=2; sector_type_index=0; and sector ID=3. Then the following beacon tone-symbols are chosen for transmission in beacon segments 0 through 17: 4 (beacon segment 0),10,34, 22,28,52, 40,46,70, 58,64,88, 76,82,106, 94,100,16 (beacon segment 17).

Decoding the slope index and sector type from the received beacon signals can be performed by any convenient method. For example, wireless terminal 300 includes downlink tone info 354 in memory 308. As stated above with respect to FIG. 3, downlink tone info 354 includes information including a carrier frequency assigned to the base station 200, the number and frequency of tones, and the set of tone subsets to be allocated to the strip-symbol periods, and other cell and sector specific values such as slope, slope index and sector type. Since wireless terminal 300 has the slope index and sector type corresponding to various beacon tones wireless terminal 300 can look up the base station identification information such as, for example, slope index and sector type, corresponding to the beacon tones of the received beacon signals. This enables the wireless terminal to at least, for example, begin communications with the acquired base station based on as few as two received beacon tone symbols.

FIG. 10 is a flow chart illustrating a method for coding and transmitting communication system parameters on beacon tones. In step 1002, available tones for communicating in a communication system are identified. In step 1004, a first beacon subset of the available tones is identified, the first beacon subset consisting of less than all of the available tones. For example, the first beacon subset may be set S0 described above with respect to FIGS. 7, 8 and 9. In step 1006, transmission is performed, on a first beacon tone of the first beacon subset of the available tones, with at least 10 dB greater power than an average per tone transmission power of the available tones during a first time period.

In step 1008, at least a first portion of a plurality of communication system parameters is coded into a first beacon tone index, the first beacon tone index corresponding to the first beacon tone. For example, the first portion of the plurality of communication system parameters may be a slope index. Or, for example, the first portion may be a portion of the slope index and a sector type index. For example, first portion may be coded as described above with respect to FIGS. 7, 8 and 9. More specifically, the first portion may be b0, described above with respect to FIGS. 7, 8 and 9. The first portion b0 is derived in part from the slope index and in part from the sector type. The first portion b0 does not completely determine the beacon tone (or beacon segment index), as can be seen in FIG. 9. The beacon segment index 902 chosen depends on the second portion R0 and a third portion R1 as well, in the example shown with respect to FIGS. 7, 8 and 9.

In step 1010, a second beacon subset of the available tones is identified, the second beacon subset consisting of less than all of the available tones. For example, the second beacon subset may be subset S I described above with respect to FIGS. 7, 8 and 9. In step 1012, transmission is performed, on a second beacon tone of the second beacon subset of the available tones, with at least 10 dB greater power than an average per tone transmission power of the available tones during a first time period.

Figure 11:
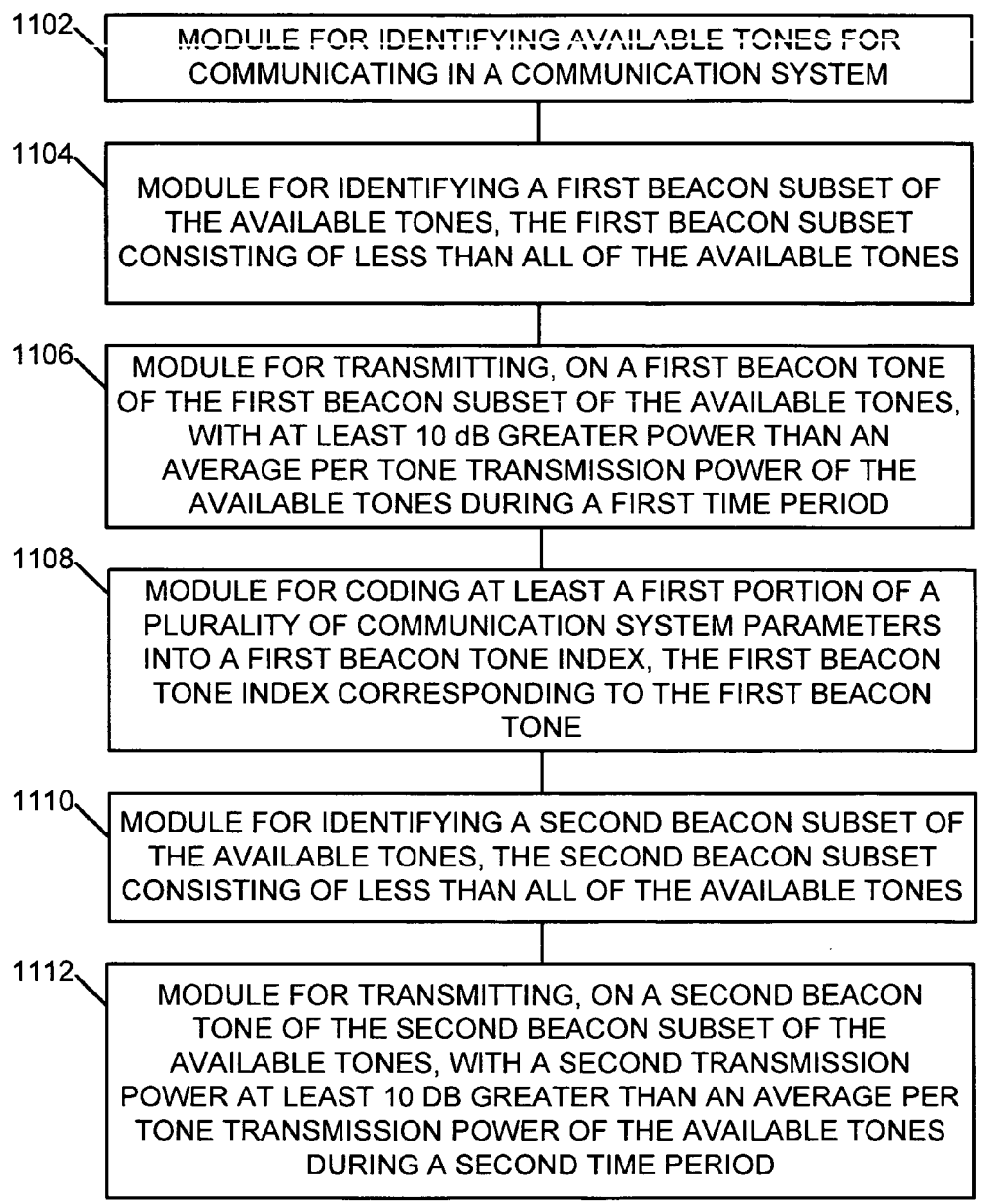
FIG. 11 illustrates a wireless communication device.

FIG. 11 is a block diagram illustrating a wireless communication device, such as, for example, base station 200 for coding and transmitting communication system parameters on beacon tones. In module 1102, available tones for communicating in a communication system are identified. Module 1102 may be, for example, beacon tone index selection module 800. In module 1104, a first beacon subset of the available tones is identified, the first beacon subset consisting of less than all of the available tones. Module 1104 may be, for example, beacon tone index selection module 800. For example, the first beacon subset may be set SO described above with respect to FIGS. 7, 8 and 9. In module 1106, transmission is performed, on a first beacon tone of the first beacon subset of the available tones, with at least 10 dB greater power than an average per tone transmission power of the available tones during a first time period. Module 1106 may be communication routines 222 which may use transmitter 204 to transmit.

In module 1108, at least a first portion of a plurality of communication system parameters is coded into a first beacon tone index, the first beacon tone index corresponding to the first beacon tone. For example, the first portion of the plurality of communication system parameters may be a slope index. Or, for example, the first portion may be a portion of the slope index and a sector type index. For example, first portion may be coded as described above with respect to FIGS. 7, 8 and 9. More specifically, the first portion may be b0, described above with respect to FIGS. 7, 8 and 9. The first portion b0 is derived in part from the slope index and in part from the sector type. The first portion b0 does not completely determine the beacon tone (or beacon segment index), as can be seen in FIG. 9. The beacon segment index 902 chosen depends on the second portion R0 and a third portion R1 as well, in the example shown with respect to FIGS. 7, 8 and 9. Module 1108 may be, for example, beacon tone index selection module 800.

In module 1110, a second beacon subset of the available tones is identified, the second beacon subset consisting of less than all of the available tones. For example, the second beacon subset may be subset S1 described above with respect to FIGS. 7, 8 and 9. Module 1110 may be, for example, beacon tone index selection module 800. In module 1112, transmission is performed, on a second beacon tone of the second beacon subset of the available tones, with at least 10 dB greater power than an average per tone transmission power of the available tones during a first time period. Module 11 12 may be communication routines 222 which may use transmitter 204 to transmit.

Messages described in the present patent application are stored in the memory of the nodes which generate and/or receive said messages in addition to the nodes through which said messages are communicated. Accordingly, in addition to being directed to methods and apparatus for generating, transmitting and using novel messages of the present invention, the present invention is also directed to machine readable media, e.g., memory, which stores one or more of the novel messages of the type described and shown in the text and figures of the present application.

In various embodiments nodes described herein are implemented using one or more modules to perform the steps corresponding to one or more methods described herein, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, a machine-readable medium can include machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of broadcasting beacon signals in a frequency division multiplexing communication system, the method comprising:

identifying a plurality of disjoint beacon subsets of available tones in a single contiguous tone block for communicating beacon signals in the communication system, said plurality of disjoint subsets of available tones including a first beacon subset, a second beacon subset, and a third beacon subset within said contiguous tone block;

wherein tones in said first, second and third beacon subsets are interspersed in said tone block such that at least two tones of the first beacon subset have at least one tone of a different one of the plurality of disjoint beacon subsets between them;

selecting, from the first beacon subset, as a function of cell information and sector information, a first tone for use as a first beacon tone of a first indexed beacon slot, said first indexed beacon slot being part of a timing structure including a plurality of indexed beacon slots;

generating a first beacon signal; and transmitting the generated first beacon signal on the first beacon tone in the first indexed beacon slot;

wherein none of the tones in said plurality of disjoint beacon subsets of available tones are immediately adjacent another tone in said plurality of disjoint beacon subsets of available tones; and wherein tones in the first subset have a tone spacing of at least nine tones.

2. The method of claim 1, further comprising:

coding at least a first portion of a plurality of communication system parameters into a first beacon tone index, the first beacon tone index corresponding to the first beacon tone.

3. The method of claim 2, wherein a first communication system parameter of the plurality of communication system parameters is a slope hopping index.

4. The method of claim 2, wherein a second communication system parameter of the plurality of communication system parameters is a sector type.

5. The method of claim 2, further comprising:

selecting, from the second beacon subset, as a function of the cell information and sector information, a second tone for use as a second beacon tone of a second indexed beacon slot in said recurring timing structure;

generating a second beacon signal; and transmitting the generated a second beacon signal, on the second beacon tone of the second beacon subset in the second indexed beacon slot.

6. The method of claim 5, further comprising:

coding at least a second portion of the plurality of communication system parameters into a second beacon tone index, the second beacon tone index corresponding to the second beacon tone, wherein the second portion is different from the first portion.

7. The method of claim 6, further comprising:

selecting, for a third indexed beacon slot in said recurring timing structure, as a function of the cell information and sector information, a third tone from the third beacon subset for use as a third beacon tone of the third indexed beacon slot;

generating a third beacon signal; and transmitting the generated third beacon signal on the third beacon tone in the third indexed time slot.

8. The method of claim 5, wherein between any two tones of said second beacon subset there is at least one tone corresponding to a different beacon subset.

9. A non-transitory computer readable medium embodying instructions for controlling a communications device to broadcast beacon signals in a frequency division multiplexing communication system, the non-transitory computer readable medium comprising:
    instructions for controlling said device to identify a plurality of disjoint beacon subsets of available tones in a single contiguous tone block for communicating beacon signals in the communication system, said plurality of disjoint subsets of available tones including a first beacon subset, a second beacon subset, and a third beacon subset within said contiguous tone block;
    wherein tones in said first, second and third beacon subsets are interspersed in said tone block such that at least two tones of the first beacon subset have at least one tone of a different one of the plurality of disjoint beacon subsets between them;
    instructions for controlling said device to select, from the first beacon subset, as a function of cell information and sector information, a first tone for use as a first beacon tone of a first indexed beacon slot, said first indexed beacon slot being part of a timing structure including a plurality of indexed beacon slots;
    instructions for controlling said device to generate a first beacon signal; and
    instructions for controlling said device to transmit the generated first beacon signal, on the first beacon tone in the first indexed beacon slot;
    wherein none of the tones in said plurality of disjoint beacon subsets of available tones are immediately adjacent another tone in said plurality of disjoint beacon subsets of available tones; and
    wherein tones in the first subset have a tone spacing of at least nine tones.

10. The non-transitory computer readable medium of claim 9, wherein the non-transitory computer readable medium further comprises:
    instructions for controlling said device to code at least a first portion of a plurality of communication system parameters into a first beacon tone index, the first beacon tone index corresponding to the first beacon tone.

11. The non-transitory computer readable medium of claim 10, wherein a first communication system parameter of the plurality of communication system parameters is a slope hopping index.

12. The non-transitory computer readable medium of claim 10, wherein a second communication system parameter of the plurality of communication system parameters is a sector type.

13. The non-transitory computer readable medium of claim 10, wherein the non-transitory computer readable medium further comprises:
    instructions for controlling said device to select, from the second beacon subset, as a function of cell information and sector information, a second tone for use as a second beacon tone of a second indexed beacon slot in said recurring timing structure;
    instructions for controlling said device to generate a second beacon signal; and
    instructions for controlling said device to transmit the generated second beacon signal, on the second beacon tone in the second indexed beacon slot.

14. The non-transitory computer readable medium of claim 13, wherein the non-transitory computer readable medium further comprises:
    instructions for controlling said device to code at least a second portion of the plurality of communication system parameters into a second beacon tone index, the second beacon tone index corresponding to the second beacon tone, wherein the second portion is different from the first portion.

15. The non-transitory computer readable medium of claim 13, wherein between any two tones of said second beacon subset there is at least one tone corresponding to a different beacon subset.

16. A wireless communication device for broadcasting beacon signals in a frequency division multiplexing communication system, the device comprising:
    means for identifying a plurality of disjoint beacon subsets of available tones in a single contiguous tone block for communicating beacon signals in the communication system, said plurality of disjoint subsets of available tones including a first beacon subset, a second beacon subset, and a third beacon subset within said contiguous tone block;
    wherein tones in said first, second and third beacon subsets are interspersed in said tone block such that at least two tones of the first beacon subset have at least one tone of a different one of the plurality of disjoint beacon subsets between them;
    means for selecting, from the first beacon subset, as a function of cell information and sector information, a first tone for use as a first beacon tone of a first indexed beacon slot, said first indexed beacon slot being part of a timing structure including a plurality of indexed beacon slots;
    means for generating a first beacon signal; and
    means for transmitting the generated first beacon signal, on the first beacon tone in the first indexed beacon slot;
    wherein none of the tones in said plurality of disjoint beacon subsets of available tones are immediately adjacent another tone in said plurality of disjoint beacon subsets of available tones; and
    wherein tones in the first subset have a tone spacing of at least nine tones.

17. The wireless communication device of claim 16, further comprising:
    means for coding at least a first portion of a plurality of communication system parameters into a first beacon tone index, the first beacon tone index corresponding to the first beacon tone.

18. The wireless communication device of claim 17, wherein a first communication system parameter of the plurality of communication system parameters is a slope hopping index.

19. The wireless communication device of claim 17, wherein a second communication system parameter of the plurality of communication system parameters is a sector type.

20. The wireless communication device of claim 17, further comprising:
    means for selecting, from the second beacon subset, as a function of the cell information and sector information, a second tone for use as a second beacon tone of a second indexed beacon slot in said recurring timing structure
    means for generating a second beacon signal; and
    means for transmitting the generated a second beacon signal, on the second beacon tone of the second beacon subset in the second indexed beacon slot.

21. The wireless communication device of claim 20, further comprising:
    means for coding at least a second portion of the plurality of communication system parameters into a second beacon tone index, the second beacon tone index corresponding to the second beacon tone, wherein the second portion is different from the first portion.

22. The wireless communication device of claim 20, wherein between any two tones of said second beacon subset there is at least one tone corresponding to a different beacon subset.

23. A wireless communication device for broadcasting beacon signals in a frequency division multiplexing communication system, the wireless communication device comprising:
a processor configured to perform a method, the method comprising:
identifying a plurality of disjoint beacon subsets of available tones in a single contiguous tone block for communicating beacon signals in the communication system, said plurality of disjoint subsets of available tones including a first beacon subset, a second beacon subset, and a third beacon subset within said contiguous tone block
wherein tones in said first, second and third beacon subsets are interspersed in said tone block such that at least two tones of the first beacon subset have at least one tone of a different one of the plurality of disjoint beacon subsets between them;
selecting, from the first beacon subset, as a function of cell information and sector information, a first tone for use as a first beacon tone of a first indexed beacon slot, said first indexed beacon slot being part of a timing structure including a plurality of indexed beacon slots; and
generating a first beacon signal; and
a transmitter connected to the processor and configured to transmit the generated first beacon signal, on the first beacon tone in the first indexed beacon slot;
wherein none of the tones in said plurality of disjoint beacon subsets of available tones are immediately adjacent another tone in said plurality of disjoint beacon subsets of available tones; and
wherein tones in the first subset have a tone spacing of at least nine tones.

24. The wireless communication device of claim 23, wherein the method, performed by said processor, further comprises:
coding at least a first portion of a plurality of communication system parameters into a first beacon tone index, the first beacon tone index corresponding to the first beacon tone.

25. The wireless communication device of claim 24, wherein a first communication system parameter of the plurality of communication system parameters is a slope hopping index.

26. The wireless communication device of claim 24, wherein a second communication system parameter of the plurality of communication system parameters is a sector type.

27. The wireless communication device of claim 24, wherein the method, performed by said processor, further comprises:
selecting, from the second beacon subset, as a function of cell information and sector information, a second tone for use as a second beacon tone of a second indexed beacon slot in said recurring timing structure;
generating a second beacon signal; and
wherein the transmitter is further configured to transmit the generated a second beacon signal, on the second beacon tone of the second beacon subset in the second indexed beacon slot.

28. The wireless communication device of claim 27, wherein the method, performed by said processor, further comprises:
coding at least a second portion of the plurality of communication system parameters into a second beacon tone index, the second beacon tone index corresponding to the second beacon tone, wherein the second portion is different from the first portion.

29. The wireless communication device of claim 27, wherein between any two tones of said second beacon subset there is at least one tone corresponding to a different beacon subset.

30. The method of claim 1, wherein two adjacent tones in said contiguous tone block include at most one tone from any one of the first, second or third beacon subsets.

31. The non-transitory computer readable medium of claim 9, wherein two adjacent tones in said contiguous tone block include at most one tone from any one of the first, second or third beacon subsets.

32. The wireless communication device of claim 16, wherein two adjacent tones in said contiguous tone block include at most one tone from any one of the first, second or third beacon subsets.

33. The wireless communication device of claim 23, wherein two adjacent tones in said contiguous tone block include at most one tone from any one of the first, second or third beacon subsets.

34. The method of claim 1, wherein tones in said disjoint beacon subsets of available tones are separated by at least two tones which are not included in said disjoint beacon subsets of available tones.

35. The non-transitory computer readable medium of claim 9, wherein tones in said disjoint beacon subsets of available tones are separated by at least two tones which are not included in said disjoint beacon subsets of available tones.

36. The wireless communication device of claim 16, wherein tones in said disjoint beacon subsets of available tones are separated by at least two tones which are not included in said disjoint beacon subsets of available tones.

37. The wireless communication device of claim 23, wherein tones in said disjoint beacon subsets of available tones are separated by at least two tones which are not included in said disjoint beacon subsets of available tones.

* * * * *

UNITED STATES PATENT AND TRADEMARK OFFICE
CERTIFICATE OF CORRECTION

PATENT NO. : 8,351,405 B2  
APPLICATION NO. : 11/486653  
DATED : January 8, 2013  
INVENTOR(S) : Li et al.

Page 1 of 1

It is certified that error appears in the above-identified patent and that said Letters Patent is hereby corrected as shown below:

On the Title Page, Item (75), Inventors: "Vladimir Parizhisky" to read as --Vladimir Parizhsky--

Signed and Sealed this  
Twelfth Day of November, 2013

Teresa Stanek Rea  
*Deputy Director of the United States Patent and Trademark Office*